United States Patent

Domenico

[11] 3,895,016
[45] July 15, 1975

[54] HALOPYRIDYL THIOALKYLTHIO CYANATES

[75] Inventor: Penelope B. Domenico, Fairfax, Va.

[73] Assignee: The Dow Chemical Company, Midland, Mich.

[22] Filed: Apr. 15, 1974

[21] Appl. No.: 460,834

[52] U.S. Cl............................ 260/294.8 G; 424/263
[51] Int. Cl.............................................. C07d 31/50
[58] Field of Search............................. 260/294.8 G

[56] References Cited
UNITED STATES PATENTS

| | | | |
|---|---|---|---|
| 3,758,482 | 9/1973 | Domenico | 260/294.8 G |
| 3,787,422 | 1/1974 | Domenico | 260/294.8 F |
| 3,787,425 | 1/1974 | Domenico | 260/294.8 G |

OTHER PUBLICATIONS

Friedrich et al., Chem. Abstracts, Vol. 63, (6) 6971-F to 6972-F (Sept. 1965).

*Primary Examiner*—Alan L. Rotman
*Attorney, Agent, or Firm*—S. Preston Jones

[57] ABSTRACT

Compounds corresponding to the formula

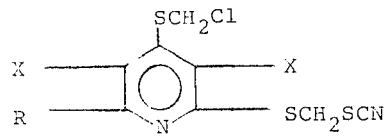

wherein X represents hydrogen, chloro or bromo and R represents X or thioalkylthiocyanato (—SCH$_2$SCN). These compounds have been found to be useful as bactericides and fungicides.

5 Claims, No Drawings

HALOPYRIDYL THIOALKYLTHIO CYANATES

PRIOR ART

Various pyridyl thioalkylthio cyanates are known and are taught in Belgian Pat. No. 722018. Other related compounds are taught in Chemical Abstracts, Vol. 63, pp. 6971f through 6972f, especially 6972b (1965); and U.S. Pat. No. 3,758,482.

SUMMARY OF THE INVENTION

The present invention is directed to halopyridyl thioalkylcyanates corresponding to the formula

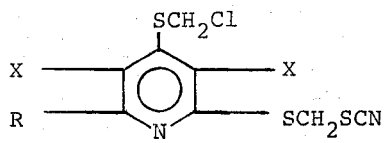

In this and succeeding formulae, X represents hydrogen, chloro or bromo and R represents X or thioalkylthiocyanato (—SCH$_2$SCN).

For convenience, the compounds embraced by the generic formula will be hereinafter identified as halopyridyl thioalkylthiocyanates.

The halopyridyl thioalkylthiocyanates of the present invention are crystalline solids or oils which are of low solubility in water and of moderate solubility in common organic solvents. These compounds have low phytotoxicity and are suitable for use as bactericides and fungicides.

The compounds of the present invention can be prepared by the reaction of an appropriate chloromethylthio substituted halopyridine with an alkali metal thiocyanate in the presence of a reaction medium or solvent. This reaction can be represented as follows:

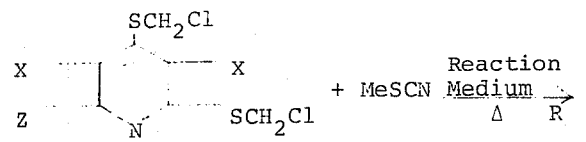

wherein X and R are as hereinbefore defined and Me represents sodium, lithium potassium, cesium or rubidium and Z represents hydrogen, chloro, bromo or chloromethylthio (—SCH$_2$Cl).

In carrying out this reaction, the reactants are contacted together in the presence of an inert reaction medium or solvent such as for example, dimethylformamide, hexamethylphosphoramide, or 4-formylmorpholine. The reactants are usually mixed at room temperature and the reaction carried out at a temperature of between about 50° and 150°C for about 30 minutes to about 3 hours. After the completion of the reaction, the mixture is poured into ice water and the solid product precipitates out and is recovered by filtration, water washed and dried. The product if desired can be purified by recrystallization from a solvent such as for example, benzene, hexane, pentane or mixtures thereof.

DESCRIPTION OF SOME PREFERRED EMBODIMENTS

The following examples illustrate the present invention and the manner by which it can be practiced, but, as such, should not be construed as limitations upon the overall scope of the same.

EXAMPLE I 3,5,6-Trichloro-4-(chloromethylthio)-2-[(thiomethyl)-thiocyanato]pyridine

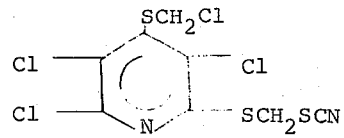

To a stirring solution of 5.0 grams (0.015 mole) of 3,5,6-trichloro-2,4-bis(chloromethylthio)pyridine in 20 milliliters of dimethylformamide, at room temperature, was added a solution of 3.5 grams (0.03 mole) of potassium thiocyanate in 20 milliliters of dimethylformamide. The mixture was heated at 80°C for 1 hour after which the mixture was cooled and poured into ice water. The solid 3,5,6-trichloro-4-(chloromethylthio)-2-[(thiomethyl)-thiocyanato]pyridine which precipitated was recovered by filtration and dried. The product was purifed by recrystallization from hexane. The product melted at 80°–82°C and upon analysis was found to have carbon, hydrogen, chlorine, nitrogen and sulfur contents of 26.4, 1.3, 39.4, 7.3 and 26.0 percent, respectively, as compared with the theoretical contents of 26.2, 1.1, 38.7, 7.7 and 26.3 percent, respectively, calculated for the above named compound.

EXAMPLE II 3,5-Dichloro-4-(chloromethylthio)-2,6-bis-[(thiomethyl)thiocyanato]pyridine

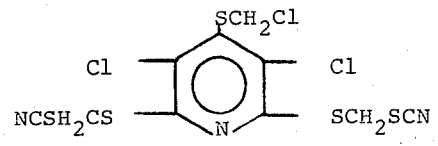

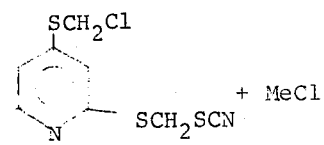

To a stirred solution of 5 grams (0.013 mole) of 3,5-dichloro-2,4,6-tris-(chloromethylthio)pyridine in 15 milliliters of dimethylformamide was added a solution of 7.5 grams (0.077 mole) of potassium thiocyanate in 10 milliliters of dimethylformamide. The mixture was heated at 100°C for 1 hour, cooled and poured into ice water. The solid 3,5-dichloro-4-(chloromethylthio)-2,6-bis-[(thiomethyl)thiocyanato]pyridine which precipitated was recovered by filtration and dried. The product was purified by recrystallization from hexane. The product melted at 126°C and was recovered in a yield of 4.2 grams (75 percent of theoretical). Upon analysis, the compound was found to have carbon, hydrogen, chlorine, nitrogen and sulfur contents of 28.1, 1.6, 24.0, 10.0 and 36.4 percent, respectively, as compared with the theoretical contents of 27.6, 1.4, 24.4, 10.0 and 37.0 percent, respectively, calculated for the above named compound.

The following compounds of the present invention are prepared in accordance with the methods hereinbefore set forth.

4-(Chloromethylthio)-2-[(thiomethyl)thiocyanato]-pyridine, having a molecular weight of 262.75;

4-(Chloromethylthio)-2,6-bis-[(thiomethyl)-thiocyanato]pyridine, having a molecular weight of 365.91;

3,5-Dibromo-4-(chloromethylthio)-2-[(thiomethyl)-thiocyanato]pyridine, having a molecular weight of 408.58;

3,5,6-Tribromo-4-(chloromethylthio)-2-[(thiomethyl)-thiocyanato]pyridine, having a molecular weight of 487.50;

3,5-Dibromo-4-(chloromethylthio)-2,6-bis-[(thiomethyl)thiocyanato]pyridine, having a molecular weight of 423.75.

In accordance with the present invention, it has been discovered that the halopyridylthioalkylthiocyanates can be employed for the control of many bacterial and fungal organisms. In still further operations, the compounds of the present invention or compositions containing them as toxic constituents can be included in and on plaster, ink, wallboard, textiles, paper, adhesives, soaps, synthetic detergents, cutting oils, polymeric materials, embalming fluids, oil paints and latex paints to prevent the attack of various fungal pests and the subsequent economic loss due to the degradation of such products by micro-organisms. Also, the compounds can be distributed in textiles or cellulosic materials to preserve and protect such products from the attack of the organisms of rot, mold and decay.

The exact concentration of the toxicant to be employed in the treating compositions is not critical and may vary considerably provided the required dosage of the effective agent is supplied in the ink, adhesive, soap, cutting oil, polymeric material, paint, textile, paper, or growth medium. The concentration of toxicant in liquid compositions generally is from about 0.0001 to 50 percent by weight. Concentrations up to 95 percent by weight are oftentimes conveniently employed, particularly in concentrate compositions. In dusts, the concentrations of the toxicant can be from about 0.1 to 95 percent by weight. In compositions to be employed as concentrates, the toxicants can be present in a concentration of from 5 to 98 percent by weight. For use as a spray, it is often convenient to prepare the compounds as wettable powders.

In a representative operation 3,5,6-trichloro-4-(chloromethylthio)-2-[(thiomethyl)thiocyanato]pyridine when employed as the sole toxicant in a nutrient agar at a concentration of 10 parts by weight of the compound per million parts of agar was found to give 100 percent kill and control of the organisms Staphylococcus aureus, Candida albicans, Mycobacterium phlei, Bacillus subtilis, Trichophyton mentagrophytes, Ceratocystis ips, and Aspergillus terreus.

In an additional operation, 3,5-dichloro-4-(chloromethylthio)-2,6-bis-[(thiomethyl)thiocyanato]-pyridine was found to give 100 percent kill and control of the organism Tricophyton mentagrophytes, when employed as the sole toxicant in a nutrient agar at a concentration of about 500 parts by weight of the compound per million parts of agar.

What is claimed is

1. A compound corresponding to the formula

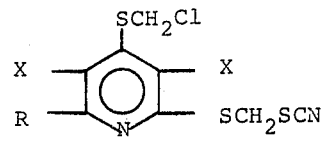

wherein X represents hydrogen, chloro or bromo and R represents X or thioalkylthiocyanato (—SCH₂SCN).

2. The compound of claim 1 corresponding to the formula

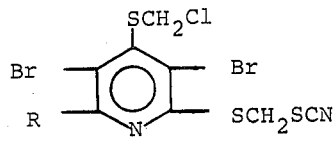

3. The compound of claim 1 corresponding to the formula

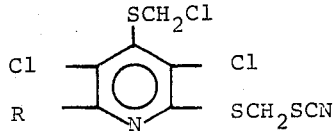

4. The compound of claim 3 which is 3,5,6-trichloro-4-(chloromethylthio)-2-[(thiomethyl)thiocyanato]-pyridine.

5. The compound of claim 3 which is 3,5-dichloro-4-(chloromethylthio)-2,6-bis-[(thiomethyl)-thiocyanato]pyridine.

* * * * *